United States Patent
Perras

(10) Patent No.: US 7,104,554 B2
(45) Date of Patent: Sep. 12, 2006

(54) DEVICES AND METHODS FOR SERVICING VEHICLES HAVING TIRES

(76) Inventor: Richard J. Perras, 445 Bozenkill Rd., Altamont, NY (US) 12009

( * ) Notice: Subject to any disclaimer, the term of this patent is extended or adjusted under 35 U.S.C. 154(b) by 114 days.

(21) Appl. No.: 10/785,136

(22) Filed: Feb. 24, 2004

(65) Prior Publication Data
US 2004/0164605 A1 Aug. 26, 2004

Related U.S. Application Data

(60) Provisional application No. 60/449,586, filed on Feb. 26, 2003.

(51) Int. Cl.
*B62B 1/00* (2006.01)
(52) U.S. Cl. .............. 280/47.27; 254/131; 414/490
(58) Field of Classification Search .......... 254/8 B, 254/8 R, 131; 104/10; 280/767, 755, 47.27, 280/47.29, 47.24; 157/1.3; 414/490, 454
See application file for complete search history.

(56) References Cited

U.S. PATENT DOCUMENTS

| | | | | |
|---|---|---|---|---|
| 810,722 A * | 1/1906 | Cook | ................ | 280/767 |
| 1,216,655 A | 2/1917 | Campbell | | |
| 2,744,762 A * | 5/1956 | Kirk | ................ | 280/47.28 |
| 4,630,837 A * | 12/1986 | Kazmark | ................ | 280/47.2 |
| 4,681,330 A * | 7/1987 | Misawa | ................ | 280/47.2 |
| 5,445,399 A * | 8/1995 | Salvucci, Sr. | ................ | 280/47.27 |
| 5,474,313 A | 12/1995 | Marquardt | ................ | 280/47.28 |
| 5,716,061 A * | 2/1998 | Sloan et al. | ................ | 280/43.23 |
| 5,826,857 A | 10/1998 | Brack et al. | ................ | 254/8 |
| 5,971,360 A | 10/1999 | Sinsley | ................ | 254/8 |
| 6,059,512 A * | 5/2000 | Kielinski | ................ | 414/490 |
| 6,520,482 B1 * | 2/2003 | Bigham | ................ | 254/131 |
| 6,824,160 B1 * | 11/2004 | Goldie | ................ | 280/641 |

OTHER PUBLICATIONS

Advertisement—AFF "Truck Wheel Dolly".

* cited by examiner

*Primary Examiner*—Frantz F. Jules
(74) *Attorney, Agent, or Firm*—Heslin Rothenberg Farley & Mesiti P.C.; John Pietrangelo

(57) ABSTRACT

Devices and methods for servicing vehicles having tires are provided. One aspect disclosed is a device having a fork for inserting under the tire, the fork having a first working end and a second end; a handle having a first end mounted to the second end of the fork and a second free end; an axle mounted to the fork; a first wheel and a second wheel rotatably mounted on the axle; a spring having a first end mounted to the axle and a second end; and a third wheel mounted to the second end of the spring. Other aspects include methods for mounting and removing tires from a vehicle using such a device. The devices and methods may be used to service any type and size of vehicle, but are particularly applicable to servicing large vehicles, such as trucks, having large tires.

19 Claims, 3 Drawing Sheets

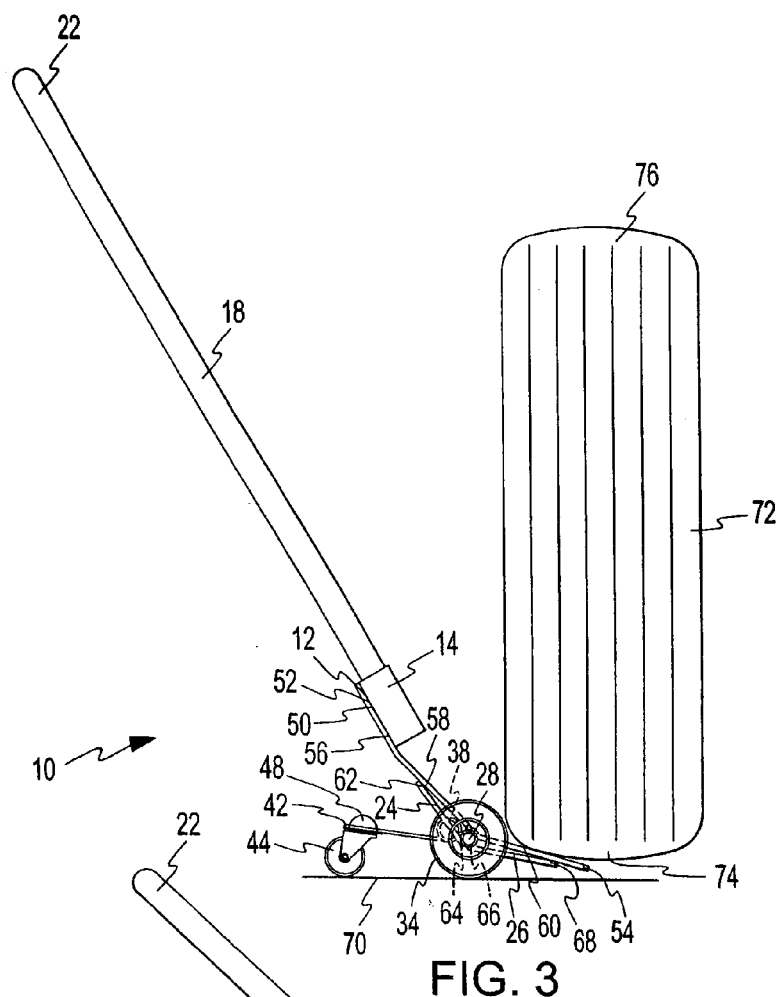
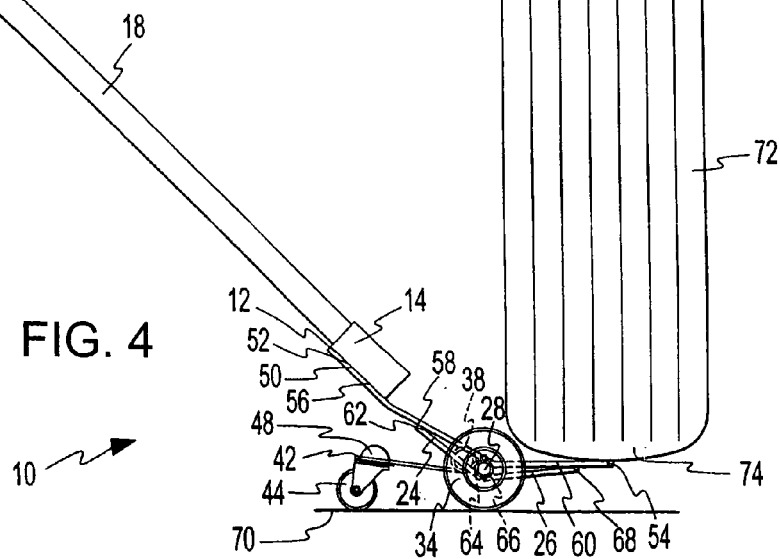
FIG. 3
FIG. 4

DEVICES AND METHODS FOR SERVICING VEHICLES HAVING TIRES

CROSS REFERENCE TO RELATED APPLICATIONS

This application claims priority to pending U.S. Provisional Application No. 60/449,586 filed on Feb. 26, 2003, the disclosure of which is incorporated by reference herein in its entirety.

FIELD OF THE INVENTION

This invention relates, generally, to tire servicing devices and methods, more specifically, aspects of the invention are concerned with tire-lifting devices and methods that can be used to position a tire, for example, a truck tire, for installation or removal.

BACKGROUND OF THE INVENTION

During the servicing of vehicles, for example, cars or trucks, it is frequently necessary to raise, lift, or jack the vehicle or one end of the vehicle above a ground or support surface in order to gain access to a particular part or component or to remove a tire and rim from the hub assembly. For instance, removal of the tire and rim is required to perform repairs or maintenance to the components of the hub assembly, such as the brakes, the ball bearings, and the like, to patch a hole in the tire (and tire tube), or to replace the tire or rim. In any event, the tire and rim must typically be removed from the hub assembly by removing the lug nuts from the studs of the hub assembly, slightly lifting the tire and rim above the studs so as not to strip or damage the screw threads of the studs while separating the tire and rim from the hub, and transporting the tire and rim to a location that does not interfere with the servicing of either the hub assembly or the tire and rim. Conversely, a tire and rim being attached to a hub assembly requires the tire and rim to be lifted to the hub assembly while simultaneously aligning the apertures of the wheel rim with the studs of the hub assembly and, once attaining such alignment, mounting the tire and rim onto the hub assembly, ensuring that the studs are received within the rim apertures without damaging the screw threads of the studs.

As a typical tire and rim together may possess considerable weight (for example, for truck tires typically in excess of one hundred pounds), removal of the tire and rim from the hub assembly is a difficult task for maintenance and service personnel to accomplish, as care must be exercised to prevent damage to any component of the hub assembly or injury to individual maintenance and service personnel. Furthermore, such a task, if performed improperly or in haste by such personnel, may result in bodily injury, such as pulled or strained muscles and pinched, mangled, or broken fingers or hands.

The subject of the instant invention provides a manually operated tire servicing device, for example, a tire lifting device, that can be positioned under a tire with rim before said tire and rim are attached to a hub assembly in order to facilitate raising of said tire and rim to the level of the hub assembly and aligning apertures of the rim with lug nut studs of the hub assembly and to facilitate removal of said tire and rim, from the hub assembly.

DISCUSSION OF THE PRIOR ART

Numerous designs for various lifting mechanisms and devices, jacks, forks, and other apparatuses have been provided in the prior art. Even though these designs may be suitable for the specific individual purposes to which they address, they would not be suitable for the purposes of the present version of the invention as such devices are not designed to facilitate removal of a tire and rim, for example, the removal of a truck tire, from a hub assembly and attachment of said tire and rim to said hub assembly. Such designs are exemplified by U.S. Pat. No. 5,474,313, entitled "Handfork", issued to Marquardt on 12 Dec. 1995; U.S. Pat. No. 5,716,061, entitled "Dolly For Moving A Snowmobile", issued to Sloan, et al. on 10 Feb. 1998; U.S. Pat. No. 5,826,857, entitled "Light Vehicle Service Stand", issued to Brack, et al. on 27 Oct. 1998; and U.S. Pat. No. 5,971,360, entitled "Lifting Apparatus For Lawn Mower Equipment", issued to Sinsley on 26 Oct. 1999.

As such, it may be appreciated that there is a continuing need for a new device for servicing, for example, lifting, a tire with rim, for example, a truck tire and rim, above a ground or support surface in order to facilitate removal of said tire with rim from a hub assembly without risking damage to the hub assembly and injury to maintenance personnel. Additionally, there is a need to facilitate attachment of said tire with rim to the hub assembly, for example, a need for means of raising tire with rim to the level of the hub assembly, aligning apertures of rim with lug nut studs of hub assembly, and positioning said tire with rim onto the hub assembly with apertures of said rim receiving lug nut studs of the hub assembly. In these respects, the present version of the invention substantially departs from the conventional concepts and designs of the prior art, and in so doing provides an apparatus that substantially fulfills these needs. Additionally, the prior patents and commercial techniques do not suggest the present inventive combination of component elements arranged and configured as disclosed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF ASPECTS OF THE INVENTION

Aspects of the invention, which will be described in greater detail hereinafter, relate to the field of tire servicing devices and methods, for example tire lifting devices and methods. More specifically, aspects of the invention are concerned with a tire servicing device, for example, a tire servicing device, that can be positioned under a tire and rim to facilitate the attachment of the tire and rim to a hub assembly or the removal of the tire and rim from the hub assembly. Aspects of the present invention overcome some if not all of the shortcomings of the prior art listed previously, in addition to novel aspects that will be described in detail hereinafter.

Described briefly, according to one aspect, the invention comprises a manually-operated tire lifting device that is comprised of a fork; hollow cylindrical sleeve attached to an upper end of the fork; handle disposed within the sleeve; four gussets and axle with wheels rotatingly attached to opposed ends of said axle, said gussets and axle located at a rear side of the fork; and a spring attached at a first end thereof to a medial portion of the axle and attached at a second end thereof to a caster wheel with roller bearing.

The fork is comprised of two rectangular arms that are connected at an upper end and extend there from for some distance so that the arms are separated from each other by about 18 degrees of arc. Each arm is comprised of an upper first segment, middle second segment disposed at an angle with respect to the upper first segment, and a lower third segment disposed at an angle with respect to the middle second segment. The cylindrical sleeve is attached to the top side of the fork at the upper first segments of the arms, and the gussets are attached at one end thereof to the rear side of the fork behind the middle second and lower third segments of said fork. The axle is attached to the fork between the gussets and the middle second segments of the fork. Two apertures are located at each end of the axle and receive fastening pins, which secure a wheel in rotating engagement to each end of the axle between each pair of pins. The coil spring is connected at a first end to the medial portion of the axle and extends for some distance there from at which point it terminates at a second end and is connected at the second end to the caster wheel.

To remove a tire from a hub assembly, the tire lifting device is grasped by the unattached end of the handle and wheeled to a location under the bottom of a tire with rim that has been raised above a floor or ground surface as is necessary for removing said tire with rim from a hub assembly to perform maintenance and repair. The user tilts the fork slightly back by the handle until the lower segments of the fork are raised and make contact with the tire at which time the fork is tilted further back, thereby raising the tire and rim with respect to the hub assembly, until the rim no longer rests on lug nut studs. The device can be pulled back by one hand of the user with the bottom of the tire resting upon the lower segments of the fork and said tire steadied during transport by the other hand of said user.

Conversely, a user can facilitate attachment of a tire with rim to a hub assembly by transporting said tire with rim upon the lower segments of the fork of the device to the hub assembly at which time the fork is tilted slightly back by the handle, which causes the lower segments of the fork to be raised above the ground surface until the apertures of the tire rim align with the lug nut studs of the hub assembly. The tire and rim, steadied by one hand of the user, are wheeled by the device towards the hub assembly until the apertures of the rim receive respective lug nut studs of the hub assembly after which the tire with rim can be secured to the hub assembly.

Aspects of the invention, therefore, reside not in any one of these features per se, but rather in the particular combination of all of them herein disclosed. It is distinguished from the prior art in this particular combination of all of its structures for the functions specified.

In order that the detailed description of the invention may be better understood and that the present contribution to the art can be more fully appreciated, additional features of the invention will be described hereinafter. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention.

In this respect, before explaining at least one aspect of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application nor is it intended to be limiting as to the scope of the invention in any way.

Accordingly, it is an object of aspects of the invention to provide a low-cost, easy-to-manufacture, and easy-to-market vehicle servicing device. A further object of my version of the invention is to provide an easy-to-use and versatile truck tire lifting device.

Another object of the invention is to provide a tire or vehicle servicing device that is comprised of a fork having two segmented arms; a hollow cylindrical sleeve attached to an upper end of the fork; a handle disposed within the sleeve; four gussets and axle with wheels rotatingly attached to opposed ends of said axle, said gussets and axle located proximate to a rear side of the fork; and a spring attached at a first end thereof to a medial portion of the axle and attached at a second end thereof to a caster wheel.

Another object of the invention is to provide a vehicle or tire servicing device that can be positioned under a tire with rim before said tire and rim are attached to a hub assembly in order to facilitate raising of said tire and rim to the level of the hub assembly and aligning apertures of the rim with lug nut studs of the hub assembly and to facilitate removal of said tire and rim from the hub assembly. In one aspect of the invention, the device may be used to service large vehicles, such as trucks.

Another aspect of the invention is a device for servicing vehicles having tires, the device including a fork for inserting under the tire, the fork having a first working end and a second end; a handle having a first end mounted to the second end of the fork and a second free end; an axle mounted to the fork; a first wheel and a second wheel rotatably mounted on the axle; a spring having a first end mounted to the axle and a second end; and a third wheel mounted to the second end of the spring. In one aspect of this invention, the third wheel comprises a caster having a roller bearing, and wherein the second end of the spring is mounted to the roller bearing.

Another aspect of the invention is a method for removing a tire and rim from a hub assembly of a vehicle using the device described above, the hub assembly having a plurality of lugs to which the hub is mounted. The method includes raising the vehicle wherein the tire and rim are raised to provide access to the bottom of the tire; inserting the first working end of the fork under the tire; depressing the second free end of the handle wherein the first working end of the fork contacts the bottom of the tire wherein the weight of the tire is unloaded from the lugs; and transporting the tire away from the vehicle wherein the tire rim is removed from the lugs to allow for servicing of one of the tire, rim, and vehicle. In one aspect of this invention, transporting the tire away from the vehicle comprises rolling the tire away from the vehicle using the first, second, and third wheels of the device. In one aspect of the invention, the third wheel is mounted on a roller bearing, and wherein rolling the tire away from the vehicle is practiced by swiveling the third wheel on the roller bearing.

A still further aspect of the invention is a method for mounting a tire on to tire mounting lugs of a vehicle using the device described above in which the tire includes a rim with mounting holes. The method including raising the vehicle to provide access to the lugs; mounting the tire onto the first working end of the fork; transporting the tire to the vicinity of the lugs; depressing the second free end of the handle wherein the first working end raises the tire and rim to align the mounting holes of the rim with the lugs; and mounting the tire onto the mounting lugs. In one aspect of this invention, the device includes a third wheel mounted on a roller bearing, and transporting the tire comprises rolling the tire on at least the third wheel and swiveling the third wheel on the roller bearing.

For a better understanding of the invention, its operating advantages and the specific objects attained by its uses, reference should be made to the accompanying drawings and descriptive matter in which there is illustrated one aspect of the invention. The foregoing has outlined some of the objects of the invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of aspects of the invention in addition to the scope of the invention illustrated by the accompanying drawings.

BRIEF DESCRIPTION OF THE DRAWINGS

The foregoing and other objects, features and advantages of the invention will become more fully understood from the following description of one aspect of the invention as illustrated in the accompanying drawings in which like reference characters refer to the same parts throughout different views. The drawings are not necessarily to scale, emphasis instead being placed upon illustrating the principles of the invention.

FIG. 3 is an elevation view of a servicing device with the lower end of the fork thereof inserted under the bottom of a tire with rim (not shown), which is partially raised above a ground surface so as to facilitate the removal of said tire and rim from the hub assembly of a vehicle or attachment of said tire and rim to the hub assembly.

FIG. 4 is an elevation view of a servicing device with the lower end of the fork thereof inserted under the bottom of a tire and pivoted slightly backward in order to raise said tire up and away from a tire hub assembly and allow said tire to be transported from the hub assembly.

DRAWING REFERENCE NUMERALS

Figure 1:
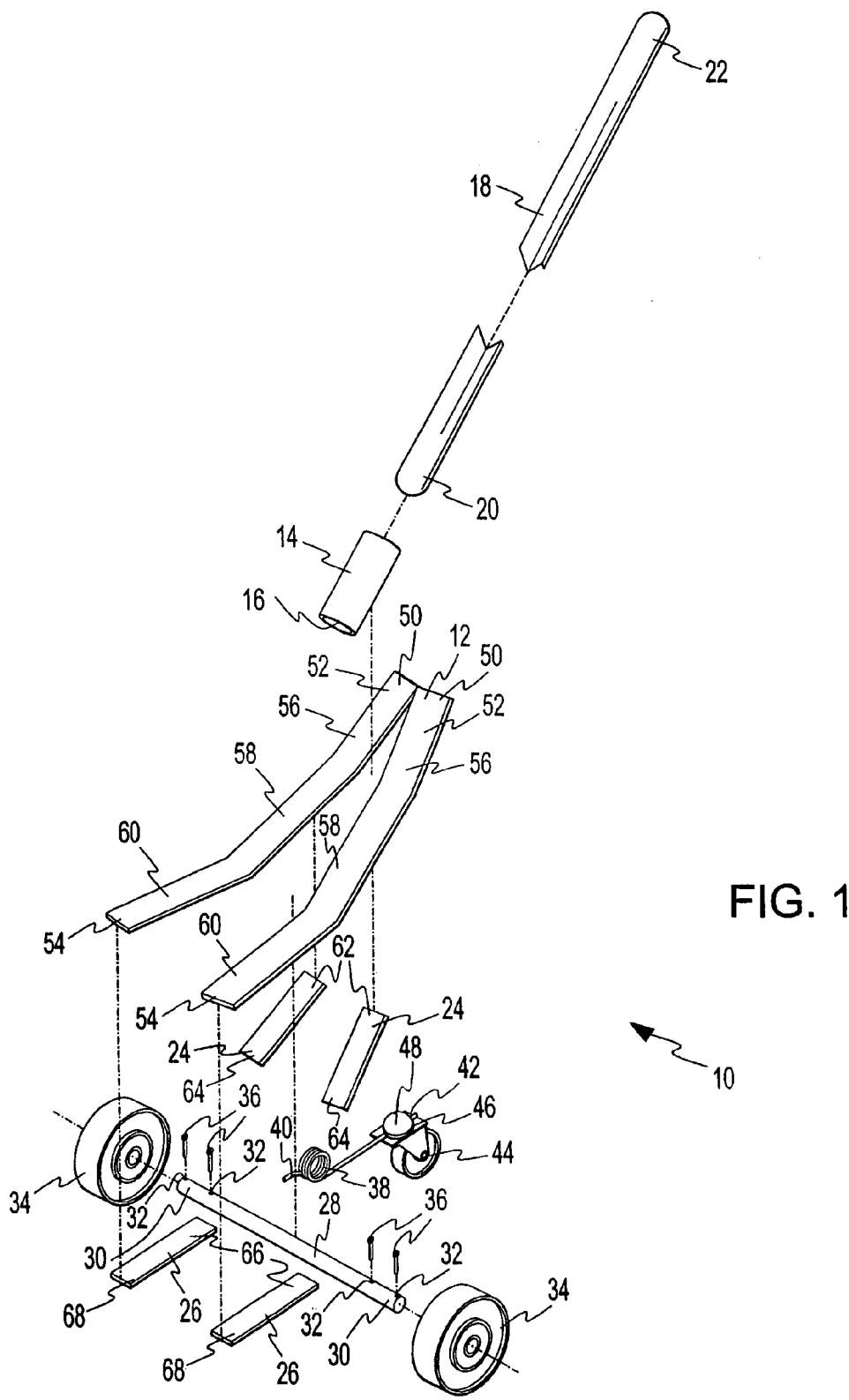
FIG. 1 is an exploded perspective view of a servicing device illustrating the constituent components thereof in accordance with one version of the present invention.

The following table of reference numerals is provided to facilitate the identification and understanding of aspects of the present invention.

| | |
|---|---|
| 10 | Servicing Device |
| 12 | Fork |
| 14 | Sleeve |
| 16 | Bore |
| 18 | Handle |
| 20 | First End |
| 22 | Second End |
| 24 | Gusset |
| 26 | Gusset |
| 28 | Axle |
| 30 | End |
| 32 | Bore |
| 34 | Wheel |
| 36 | Pin |
| 38 | Spring |
| 40 | First End |
| 42 | Second End |
| 44 | Caster Wheel |
| 46 | Planar Member |
| 48 | Bearing |
| 50 | Arm |
| 52 | First End |
| 54 | Second End |
| 56 | First Segment |
| 58 | Second Segment |
| 60 | Third Segment |
| 62 | First End |
| 64 | Second End |
| 66 | First End |
| 68 | Second End |
| 70 | Ground Surface |
| 72 | Tire |
| 74 | Bottom |
| 76 | Top |

DESCRIPTION OF ASPECTS OF THE INVENTION

Figure 2:
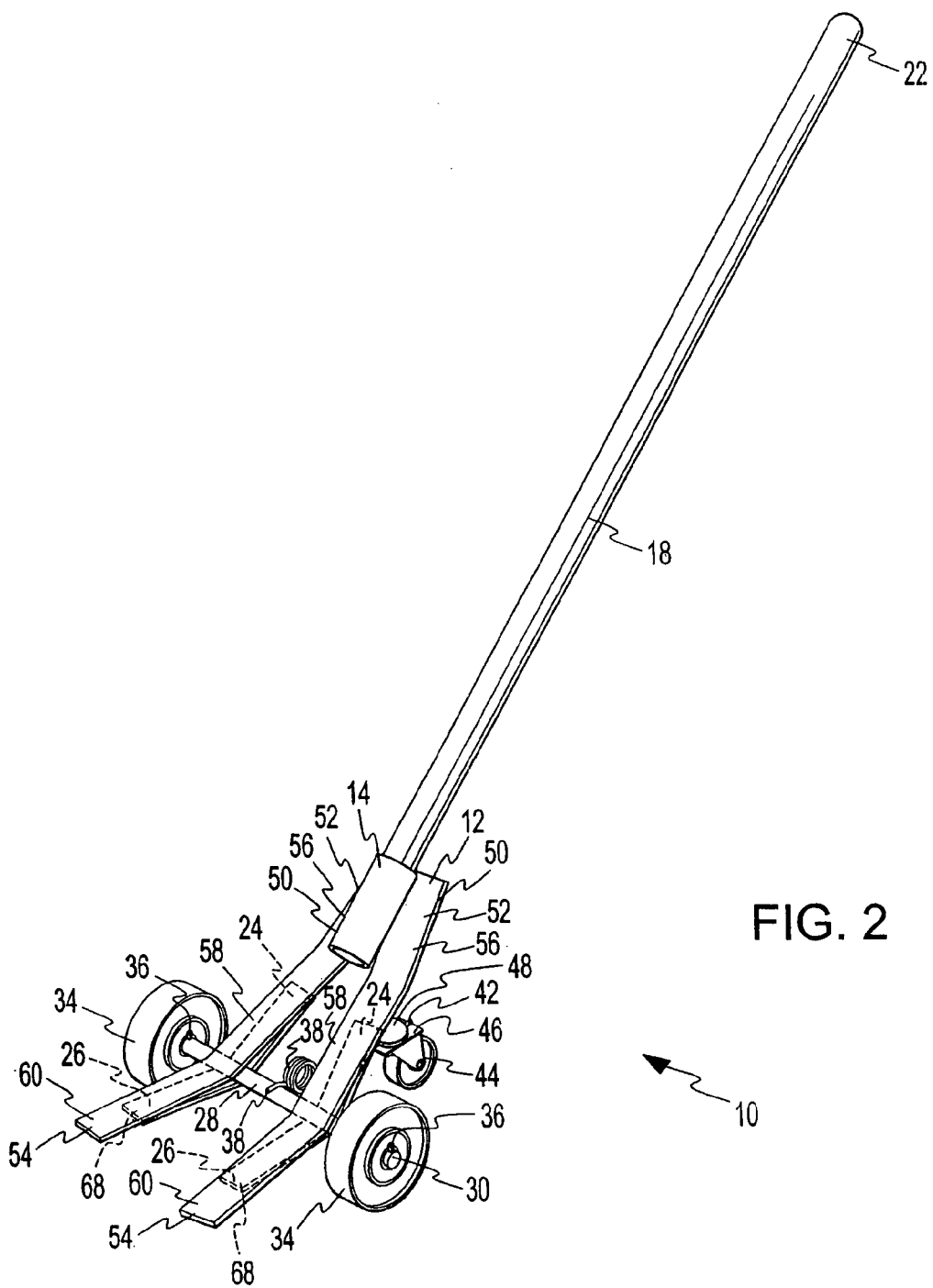
FIG. 2 is a perspective view of an assembled servicing device in accordance with one version of the present invention.

Referring now to the drawings and, in particular, to FIG. 1 and FIG. 2 wherein there are illustrated an exploded perspective view and a perspective view, respectively, of one aspect of the servicing device 10. Though in the following discussion, aspects of the invention are described with respect to their application to the servicing of vehicles having tires, it will be understood by those of skill in the art that aspects of the present invention may be used to service a vehicle having any type of tire-like or wheel-like structure or component.

In this aspect of the invention, device 10 comprises or consists of a fork 12; sleeve 14 with central bore 16; a handle 18 with a first 20 and a second 22 opposed ends; a first 24 and a second pair 26 of rectangular gussets; and an axle 28 with opposed ends 30. A pair of apertures 32 is located in the axle 28 proximate to each end 30 thereof. Wheels 34 are located at each end 30 of the axle 28 and are rotatingly attached thereon between each pair of apertures 32 and maintained between each pair of apertures 32 by fastening pins 36, for example, cotter pins, inserted into said apertures 32.

A spring, for example, a coiled spring, 38 is located between the fork 12 and axle 28 and is comprised in part of a first elongate end 40 and a second opposed elongate end 42. The spring 38 at the first end 40 thereof is attached in perpendicular relation to the medial portion of the axle 28.

A caster wheel 44 with a top planar member 46 is attached to the second end 42 of the spring 38 at the planar member 46 thereof. A roller bearing 48 is located over the planar member 46 and contains a spindle (not shown) that is attached to the caster wheel 44. The caster wheel 44 is thus able to swivel by means of the spindle rotating within the roller bearing 48.

The fork 12 is comprised of two rectangular, elongate arm members 50 having first 52 and second 54 opposed ends. The arm members 50 are attached at first ends 52 thereof and are disposed with respect to each other 50 at an angle between about 15 degrees and about 30 degrees, for example, approximately 18 degrees of arc. Each arm member 50 is comprised of an upper first segment 56, a middle second segment 58 disposed at an angle of between about 25 degrees and about 40 degrees, typically at about 30 degrees, with respect to the upper first segment 56, and a lower third segment 60 disposed at an angle of between about 10 degrees and about 16 degrees, typically at about 13 degrees, with respect to the middle second segment 58. The sleeve 14 is attached to the top side of the fork 12 at the first end 52 thereof, for example, at the top side of the upper first segments 56. The first pair of rectangular gussets 24, located at the rear side of the fork 12, consist of first 62 and second 64 opposed ends and are attached to the rear side of the arm members 50 at the first ends 62 thereof, for example, at the rear sides of the middle second segments 58. The second ends 64 of the gussets 24 are disposed at an angle of between about 10 degrees and about 16 degrees, typically at about 13 degrees, away from the rear side of the middle segments 58 of the arms 50 of the fork 12. The second pair of rectangular gussets 26, also located at the rear side of the fork 12, consist of first 66 and second 68 opposed ends and are attached to the rear side of the arm members 50 at the second ends 68 thereof, for example, at the rear sides of the lower third segments 60. The second ends 68 of the gussets 26 are disposed at an angle of between about 17 degrees and about 23 degrees, typically at about 20 degrees, away from the rear side of the lower third segments 60 of the arms 50 of the fork 12.

As shown most clearly in FIG. 2, a gap is located between the ends 64, 66 of the gussets 24, 26, respectively, not attached directly to the facing rear side of the fork 12 when the gussets 24, 26 are attached to the rear side of the fork 12 in the aforementioned manner. In one aspect of the invention, axle 28 may be inserted into said gap and attached to the rear side of the fork 12 and facing sides of the gussets 24, 26.

The tire or vehicle servicing device 10 is maintained in an upright position while resting upon the wheels 34 and caster wheel 44. The caster wheel 44 and the tension of the coil spring 38 minimize or prevent the device 10 from pivoting back upon the wheels 34 so that the handle 18 is disposed at a position above a floor or ground surface to allow easy reach by a user. In one aspect of the invention, handle 18 makes an angle between about 45 degrees and about 60 degrees with the horizontal, for example, with ground surface 70, when device 10 is unloaded. In another aspect, handle 18 makes an angle of between about 52 degrees and about 54 degrees with the horizontal when unloaded.

Referring to FIG. 3, therein illustrated is a side elevation view of the servicing device 10 located upon a ground surface 70 and adjacent to and partially under a tire 72 and rim (not shown), for example, a truck tire and rim, that has been raised slightly above the ground surface 70 as required for removal from a hub assembly (not shown). The third, or working, segment 60 of each arm 50 of the fork 12 is raised slightly above the ground surface 70, making initial contact with the bottom 74 of the tire 72 before lifting the tire 72 and away from the lug nut studs of a hub assembly. The user grasps the end 22 of the handle 18 with one hand to operate the device 10 and steadies the tire 72 by grasping the top 76 thereof.

As shown in FIG. 4, the servicing device 10 is pivoted backward for some distance by applying pressure to the end of the handle 18, which causes the fork 12 to pivot upon the wheels 34 and raise the third segments 60 of the arm members 50 of the fork 12. As a result, the tire 72 and rim is lifted above the ground surface 70 as necessary to separate the tire 72 and rim from the hub assembly, at which point the tire 72 and rim can be freely wheeled upon the device 10 with the wheels 34 supporting the full weight of the tire 72 and rim.

Conversely, the servicing device 10 can be used to lift a tire 72 and rim for attachment to a hub assembly by placing the third, or working, segments 60 of the arm members 50 of the fork 12 under the bottom 74 of the tire 72, steadying the top 76 of the tire 72 with one hand, and applying downward pressure to the end 22 of the handle 18 with the other hand and raising the tire 72 and rim above the ground surface 70. At such time, the device 10 with tire 72 and rim supported thereon can be wheeled to a hub assembly, and the tire 72 and rim can be lifted further as necessary up to the hub assembly so that the apertures of the rim line up with respective lug nut studs of the hub assembly. The device 10 with tire 72 thereon can be rotated to facilitate aligning the apertures of the rim with respective lug nuts with such rotation assisted by the spindle of the caster wheel 44 revolving within the roller bearing 48. The device 10 with tire 72 supported thereon is then wheeled towards the hub assembly until the apertures of the rim receive respective lug nut studs, and the rim makes contact with the outer surface or component of the hub assembly.

While this version of the invention has been illustrated and described in detail in the drawings and foregoing description, the same is to be considered as illustrative and not restrictive in character, it being understood that only one aspect of the invention has been shown and described and that all changes and modifications that come within the spirit of this aspect of the invention are desired to be protected. With respect to the above description then, it is to be realized that the optimum dimensional and special relationships for the parts of the invention including variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

From the foregoing, it will be understood by persons skilled in the art that an improved vehicle servicing devices and methods, for instance, vehicle tire servicing devices, have been provided. In some aspects of the invention, the disclosed devices and methods may be used to service vehicles having tires or similar wheel structures. The vehicles that may be serviced by aspects of the present invention may be any type of vehicle, including motorcycles, cars, vans, sport utility vehicles (SUVs), pick-up trucks, small and medium duty trucks, and similar vehicles. In aspects of the invention, the disclosed devices and methods may be used for servicing large vehicles, for example, having large, heavy tires. Typical large vehicles that aspects of the present invention may be used to service include, but are not limited to, trucks, buses, tractors, tractor-trailers, semis, dump trucks, snow plows, earth-moving vehicles, cranes, monster trucks, and military vehicles, among others.

Aspects of the invention are relatively simple and easy to manufacture, yet afford a variety of uses. While this description contains many specificities, these should not be construed as limitations on the scope of the invention, but rather as an exemplification of some aspects of the invention. The foregoing is considered as illustrative only of the principles of aspects of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention. Although this invention has been described with respect several aspects, or forms with a certain degree of particularity, it is understood that the present disclosure of the aspects of the invention has been made only by way of example and numerous changes in the details of construction and combination and arrangement of parts may be resorted to without departing from the spirit and scope of the invention, as defined in the following claims and their equivalents.

I claim:

1. A device for servicing vehicles having tires, the device comprising:
    a fork for inserting under the tire, the fork having a first working end and a second end;
    a handle having a first end mounted to the second end of the fork and a second free end;
    an axle mounted to the fork;
    a first wheel and a second wheel rotatably mounted on the axle;
    a spring having a first end mounted to the axle and a second end; and
    a third wheel mounted to the second end of the spring;
    wherein the device further comprises a first set of gussets mounted beneath the fork and a second set of gussets mounted beneath the fork, wherein the first and second set of gussets are adapted to provide a set of gaps beneath the fork.

2. The device as recited in claim 1, further comprising a hollow cylindrical sleeve mounted to the second end of the fork for receiving the handle.

3. The device as recited in claim 1, wherein the axle is mounted in the set of gaps.

4. The device as recited in claim 1, wherein the spring comprises a coil spring.

5. The device as recited in claim 1, wherein the third wheel comprises a caster having a roller bearing, and wherein the second end of the spring is mounted to the roller bearing.

6. The device as recited in claim 1, wherein the fork comprises two arms, each arm having a lower end and an upper end, where the arms are connected at their upper ends wherein the arms define a first angle.

7. The device as recited in claim 6, wherein the first angle is an angle between about 15 degrees and about 30 degrees.

8. The device as recited in claim 6, wherein each arm comprises an upper first segment, a middle second segment disposed at a second angle with respect to the upper first segment, and a lower third segment disposed at a third angle with respect to the middle second segment.

9. The device as recited in claim 1, wherein the vehicle is a truck.

10. A method for removing a tire and rim from a hub assembly of a vehicle using the device recited in claim 1, the hub assembly having a plurality of lugs to which the hub is mounted, the method comprising:
    raising the vehicle wherein the tire and rim are raised to provide access to the bottom of the tire;
    inserting the first working end of the fork under the tire;
    depressing the second free end of the handle wherein the first working end of the fork contacts the bottom of the tire wherein the weight of the tire is unloaded from the lugs; and
    transporting the tire away from the vehicle wherein the tire rim is removed from the lugs to allow for servicing of one of the tire, rim, and vehicle.

11. The method as recited in claim 10, wherein the vehicle includes a plurality of lug nuts mounted on the lugs, wherein the method further comprises removing the lug nuts.

12. The method as recited in claim 11, wherein transporting the tire away from the vehicle comprises rolling the tire away from the vehicle using the first, second, and third wheels of the device.

13. The method as recited in claim 12, wherein the third wheel is mounted on a roller bearing, and wherein rolling the tire away from the vehicle is practiced by swiveling the third wheel on the roller bearing.

14. The method as recited in claim 11, wherein the device comprises a third wheel mounted on a roller bearing, and wherein transporting the tire comprises rolling the tire on at least the third wheel and swiveling the third wheel on the roller bearing.

15. The method as recited in claim 10, wherein depressing the second free end of the handle comprises manually depressing the second free end of the handle.

16. The method as recited in claim 10, wherein transporting the tire comprises rolling the tire away from the vehicle by placing one hand on the top of the tire and one hand on the second free end of the handle.

17. A method for mounting a tire on to tire mounting lugs of a vehicle using the device recited in claim 1, the tire having a rim with mounting holes, the method comprising:
    raising the vehicle to provide access to the lugs;
    mounting the tire onto the first working end of the fork;
    transporting the tire to the vicinity of the lugs;
    depressing the second free end of the handle wherein the first working end raises the tire and rim to align the mounting holes of the rim with the lugs; and
    mounting the tire onto the mounting lugs.

18. The method as recited in claim 17, wherein depressing the second free end of the handle comprises manually depressing the second free end of the handle.

19. The method as recited in claim 17, wherein transporting the tire comprises placing one hand on the top of the tire and one hand on the second free end of the handle and rolling the tire toward the lugs.

* * * * *